United States Patent
Kim (10) Patent No.: US 11,614,620 B2
(45) Date of Patent: Mar. 28, 2023

(54) VEHICLE HEAD-UP DISPLAY

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/324,269

(22) Filed: May 19, 2021

(65) Prior Publication Data

US 2021/0364791 A1   Nov. 25, 2021

(30) Foreign Application Priority Data

May 20, 2020   (KR) .................. 10-2020-0060284

(51) Int. Cl.
| | |
|---|---|
| *G02B 27/01* | (2006.01) |
| *B60K 35/00* | (2006.01) |
| *G02B 26/02* | (2006.01) |
| *G02B 1/11* | (2015.01) |

(52) U.S. Cl.
CPC .......... *G02B 27/0101* (2013.01); *B60K 35/00* (2013.01); *G02B 1/11* (2013.01); *G02B 26/02* (2013.01); *B60K 2370/1529* (2019.05); *B60K 2370/166* (2019.05); *B60K 2370/167* (2019.05); *B60K 2370/178* (2019.05); *B60K 2370/23* (2019.05)

(58) Field of Classification Search
CPC ........ G02B 27/0101; G02B 2027/0118; G02B 2027/012; B60K 35/00; B60K 2370/1529
See application file for complete search history.

(56) References Cited

U.S. PATENT DOCUMENTS

| | | | | |
|---|---|---|---|---|
| 2014/0132852 A1* | 5/2014 | Pawusch | ............ | G02B 27/0149 349/11 |
| 2015/0241694 A1* | 8/2015 | Choi | .................. | G02B 27/0101 359/631 |
| 2017/0363271 A1* | 12/2017 | Igari | ..................... | H05B 41/40 |

FOREIGN PATENT DOCUMENTS

JP   2006-011168 A   1/2006

* cited by examiner

*Primary Examiner* — Ryan D Howard
(74) *Attorney, Agent, or Firm* — NovoTechIP International PLLC (57) ABSTRACT

The present invention relates to a vehicle head-up display having an external light blocking function, and more particularly, to a vehicle head-up display having an external light blocking function capable of blocking external light from being emitted to a picture generate unit. In the vehicle head-up display having an external light blocking function according to the present invention, the vehicle head-up display includes a case, a screen disposed inside the case, an aspheric mirror disposed at one side of the screen, a folding mirror disposed above the other side of the screen, a picture generate unit disposed under the other side of the screen, a shielding plate which selectively covers an upper surface of the picture generate unit, and an actuator which operates the shielding plate, wherein light generated by the picture generate unit is displayed to an outside via the folding mirror and the aspheric mirror, and when the upper surface of the picture generate unit is covered by the shielding plate operated by the actuator, the shielding plate blocks external light, which is incident via the aspheric mirror and the folding mirror, from being emitted to the picture generate unit.

18 Claims, 11 Drawing Sheets

VEHICLE HEAD-UP DISPLAY

CROSS-REFERENCE TO RELATED APPLICATION

This application claims priority to and the benefit of Korean Patent Application No. 10-2020-0060284, filed on May 20, 2020, the disclosure of which is incorporated herein by reference in its entirety.

BACKGROUND

1. Field of the Invention

The present invention relates to a vehicle head-up display having an external light blocking function, and more particularly, to a vehicle head-up display having an external light blocking function capable of blocking external light from being directed to a picture generate unit.

2. Discussion of Related Art

Recently, the vehicle market is rapidly growing with the trend of favoring not only vehicles having improved vehicle-specific functions but also intelligent vehicles onto which advanced information technology (IT) is grafted and which have convenient functions.

Amid the trend, electronization of a vehicle is spreading, and functions onto which IT and wireless communication technology are grafted are rapidly increasing.

Particularly, products for supporting stability and convenience of drivers have been commercialized, and among them, vehicle head-up displays (HUDs) with in various product lines are drawing attention.

Generally, the vehicle HUD displays an image including information about a vehicle speed, a remaining fuel amount, and a route on a windshield which is a front window of a vehicle.

A picture generate unit which generates vehicle information as light is installed in the vehicle HUD, and when external high intensity light is directed to the picture generate unit, the picture generate unit may be damaged.

Accordingly, a technology that blocks external light from being directed to the picture generate unit when the HUD is not used or external high intensity light is directed to the picture generate unit is being developed.

However, a HUD having such a conventional shielding structure still has a problem because it cannot effectively block external light from being directed to the picture generate unit.

SUMMARY OF THE INVENTION

The present invention is directed to providing a vehicle head-up display having an external light blocking function capable of blocking external light from being directed to the picture generate unit so as to prevent a picture generate unit from being damaged.

According to one aspect of the present invention, there is provided a vehicle head-up display having an external light blocking function, the vehicle head-up display including a case, a screen disposed inside the case, an aspheric mirror disposed at one side of the screen, a folding mirror disposed above the other side of the screen, a picture generate unit disposed under the other side of the screen, a shielding plate which selectively covers an upper surface of the picture generate unit, and an actuator which operates the shielding plate, wherein an image generated by the picture generate unit is displayed to an outside via the folding mirror and the aspheric mirror, and when the upper surface of the picture generate unit is covered by the shielding plate operated by the actuator, the shielding plate blocks external light, which is incident via the aspheric mirror and the folding mirror, from being directed to the picture generate unit.

The shielding plate may be vertically and rotatably installed on the screen, and the shielding plate may be rotated by the actuator to expose or cover an upper surface of the picture generate unit.

The shielding plate may be rotatably installed on the screen between the folding mirror and the picture generate unit.

The actuator may be formed as a rotary solenoid, and when external power is applied, the actuator may rotate the shielding plate.

The actuator may include a housing in which a power generator is installed, a rotating shaft which is connected to the power generator and rotated, a stopper member which is coupled to and rotated with the rotating shaft, and a rotation limiting groove which has an arc shape and is formed in a side surface of the housing, the shielding plate may be coupled to and rotated with the rotating shaft, a hook protrusion formed on the stopper member may be disposed in the rotation limiting groove, and the stopper member which is rotated with the rotating shaft may restrict a rotation of the rotating shaft and shielding plate to be within a predetermined angular range while the hook protrusion moves in the rotation limiting groove.

The actuator may include a housing in which a power generator is installed, a rotating shaft which is connected to the power generator and rotated, and an elastic member of which one end is coupled to the housing and the other end is coupled to the rotating shaft, the shielding plate may be coupled to and rotated with the rotating shaft, when the rotating shaft and the shielding plate are rotated in one direction by the power generator, the elastic member may be elastically expanded, and when electrical power generated by the power generator is removed, the rotating shaft and the shielding plate may be rotated in the other direction due to shrinking of the elastic member.

The elastic member may be formed as a spiral spring.

When the rotating shaft is rotated in the one direction by the power generator, the elastic member may be elastically expanded, and the shielding plate may expose the upper surface of the picture generate unit, and when the electrical power generated by the power generator is removed, the rotating shaft and the shielding plate may be rotated in the other direction due to shrinking of the elastic member to cover the upper surface of the picture generate unit.

A non-reflective coating portion and a reflective coating portion may be formed on one surface, which is a surface opposite to a surface facing the picture generate unit when the shielding plate covers an upper surface of the picture generate unit, of the shielding plate.

When the shielding plate covers the upper surface of the picture generate unit, the one surface of the shielding plate may be displayed to the outside via the aspheric mirror.

The non-reflective coating portion may be formed by performing a low reflective treatment or corrosion treatment.

The non-reflective coating portion may be formed by transparently or low-reflectively coating the one surface of the shielding plate and performing a corrosion treatment on the other surface thereof.

When the shielding plate covers the upper surface of the picture generate unit, the one surface of the shielding plate may be disposed to be parallel to a display of the picture generate unit.

In addition, according to another aspect of the present invention, there is provided a vehicle head-up display having an external light blocking function, the vehicle head-up display including a case, a screen disposed inside the case, an aspheric mirror disposed at one side of the screen, a folding mirror disposed above the other side of the screen, a picture generate unit disposed under the other side of the screen, a shielding plate which is disposed between the folding mirror and the picture generate unit and selectively covers an upper surface of the picture generate unit, and an actuator which operates the shielding plate, wherein an image generated by the picture generate unit is displayed to an outside via the folding mirror and the aspheric mirror, a non-reflective coating portion and a reflective coating portion are formed on one surface, which faces the folding mirror when the shielding plate is rotated to cover an upper surface n of the picture generate unit, of the shielding plate, and when the shielding plate is rotated by the actuator to cover the upper surface of the picture generate unit, the shielding plate blocks external light, which is incident via the aspheric mirror and the folding mirror, from being directed to the picture generate unit.

When the shielding plate covers the upper surface of the picture generate unit, the one surface of the shielding plate may be displayed to the outside via the folding mirror and the aspheric mirror.

The shielding plate may be vertically and rotatably installed on the screen, and the shielding plate may be rotated by the actuator to expose or cover the upper surface of the picture generate unit.

When the shielding plate covers the upper surface of the picture generate unit, the one surface of the shielding plate may be disposed to be parallel to a display of the picture generate unit.

According to still another aspect of the present invention, there is provided a vehicle head-up display having an external light blocking function, the vehicle head-up display including a case, a screen disposed inside the case, an aspheric mirror disposed at one side of the screen, a folding mirror disposed above the other side of the screen, a picture generate unit disposed under the other side of the screen, a shielding plate which selectively covers an upper surface of the picture generate unit, and an actuator which operates the shielding plate, wherein an image generated by the picture generate unit is displayed to an outside via the folding mirror and the aspheric mirror, and when the upper surface of the picture generate unit is covered by the shielding plate operated by the actuator, the shielding plate blocks external light, which is incident via the aspheric mirror and the folding mirror, from being directed to the picture generate unit.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
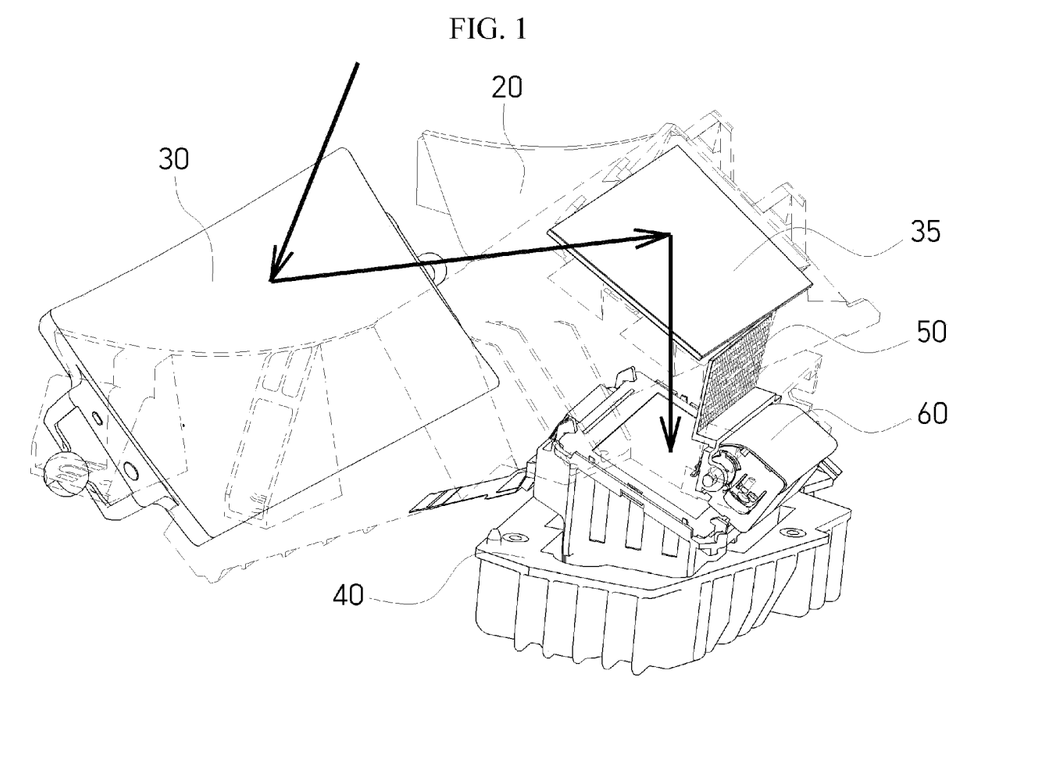
FIG. 1 is a perspective view illustrating a state of a shielding plate in a head-up display before the shielding plate rotates according to an embodiment of the present invention.
Figure 2:
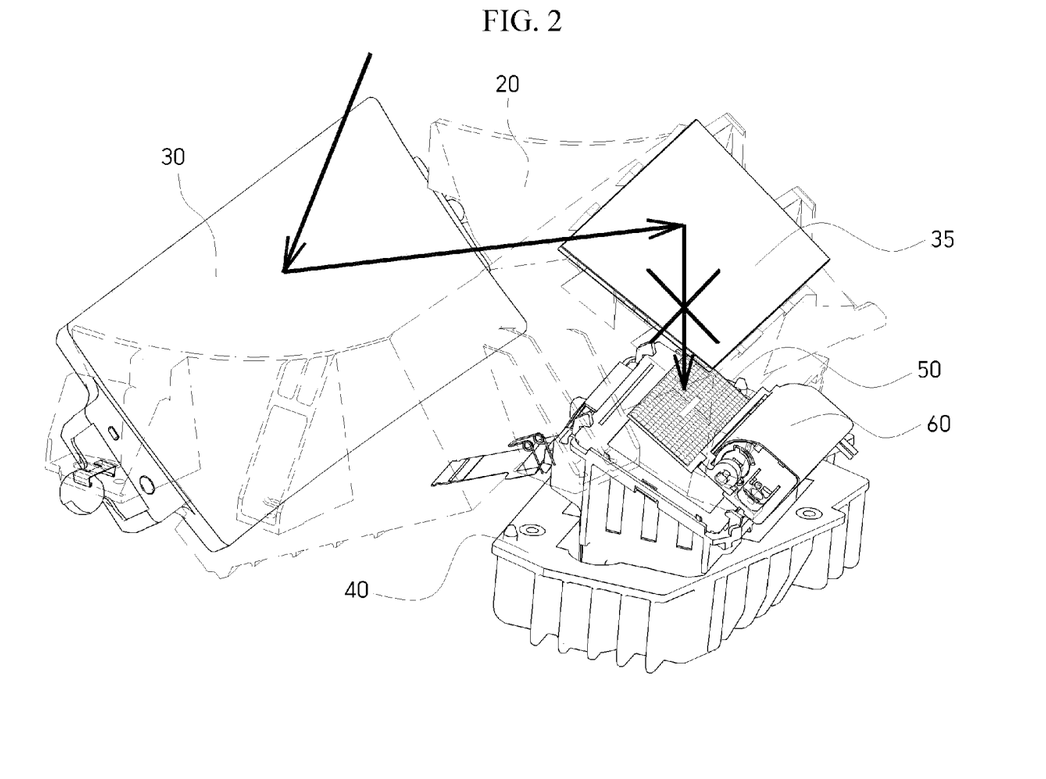
FIG. 2 is a perspective view illustrating a state in which the shielding plate in FIG. 1 rotates to cover an upper surface of a picture generate unit.

As illustrated in FIGS. 1 and 2, a vehicle head-up display having an external light blocking function of the present invention includes a case (not shown), a screen 20, an aspheric mirror 30, a folding mirror 35, a picture generate unit (PGU) 40, a shielding plate 50, and an actuator 60.

The case forms an entire exterior of the head-up display.

The screen 20 is disposed inside the case.

The aspheric mirror 30 is disposed at one side of the screen 20.

The folding mirror 35 is disposed above the other side of the screen 20.

The PGU 40 is disposed under the other side of the screen 20.

An image generated by the PGU 40 is reflected by the aspheric mirror 30 and displayed on a vehicle windshield.

The PGU 40 includes both of a light-emitting type indicator, such as a laser or a diode, and a light-receiving type indicator such as a liquid crystal display (LCD).

The shielding plate 50 selectively covers an upper surface of the PGU 40.

That is, the shielding plate 50 covers or exposes the upper surface of the PGU 40.

The actuator 60 operates the shielding plate 50 using applied power.

Hereinafter, since the case, the screen 20, the aspheric mirror 30, the folding mirror 35, and the PGU 40 are similar to those of the known conventional technology, specific descriptions thereof will be omitted, and the shielding plate 50 and the actuator 60 will be mainly described.

Although the shielding plate 50 configured to expose or close an upper surface of the PGU 40 is slid by the actuator 60 to expose or close an upper portion of the shielding plate 50, in the present invention, the shielding plate 50 is vertically and rotatably installed on the screen 20 and is rotated by the actuator 60 to open or close the upper portion of the shielding plate 50.

The shielding plate 50 may be disposed at one of various positions and rotatably installed on the screen 20 between the folding mirror 35 and the PGU 40.

Since a space area between the folding mirror 35 and the PGU 40 is the smallest, there is an advantage in that the upper surface of the PGU 40 may be exposed or closed by the small shielding plate 50 and small rotatory power.

An image generated by the PGU 40 is displayed to the outside via the folding mirror 35 and the aspheric mirror 30.

As illustrated in FIG. 2, when the shielding plate 50 is rotated downward by the actuator 60 to cover the upper surface of the PGU 40, external light incident via the aspheric mirror 30 and the folding mirror 35 is blocked from being directed to the PGU 40 by the shielding plate 50.

More specifically, at normal times, the shielding plate 50 maintains a state in which the shielding plate 50 is rotated upward so that the light generated by the PGU 40 is directed to the aspheric mirror 30 via the folding mirror 35.

Then, when external light directed to the PGU 40 via the aspheric mirror 30, that is, sun burn, is detected by a separate sensor as illustrated in FIG. 1, the shielding plate 50 is rotated downward to block the external light, which is incident via the aspheric mirror 30 and the folding mirror 35, from being directed to the PGU 40 as illustrated in FIG. 2.

Alternatively, when a vehicle is parked, the shielding plate 50 may also be rotated upward to block external light from being directed to the PGU 40 in advance.

Figure 3:
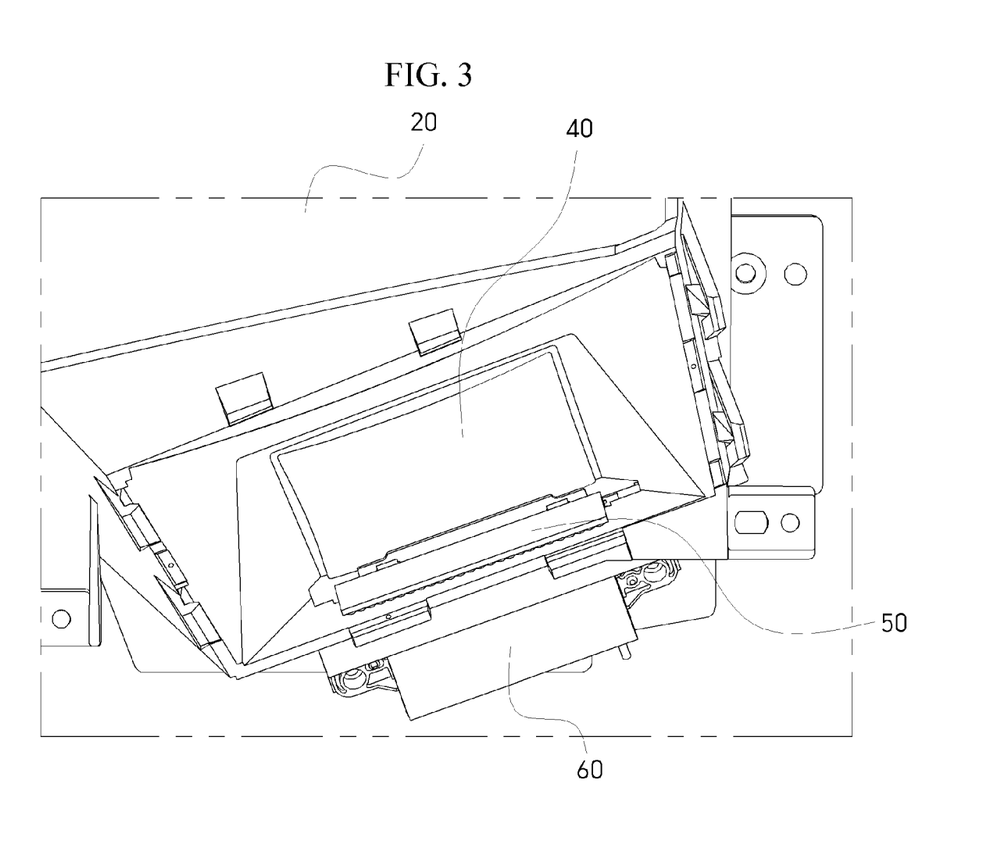
FIG. 3 is a plan view illustrating a state in which the picture generate unit is viewed in a direction from a folding mirror in the state illustrated in FIG. 1.
Figure 4:
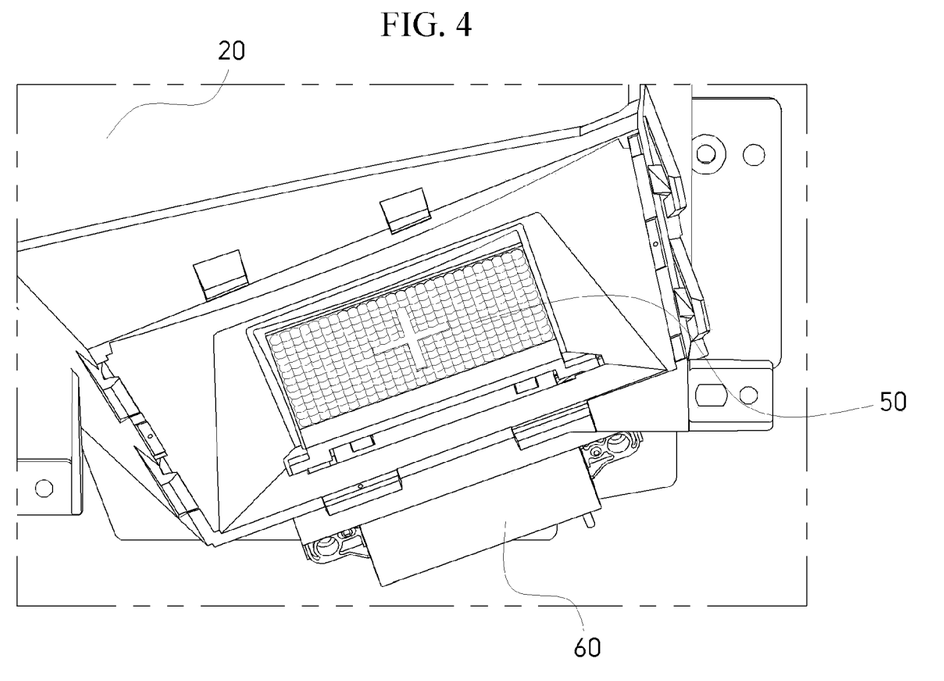
FIG. 4 is a plan view illustrating a state in which the picture generate unit is viewed in the direction from the folding mirror in the state illustrated in FIG. 2.

As illustrated in FIGS. 1 and 3, although external light reflected by the folding mirror 35 may be directed to the PGU 40 in a state in which the shielding plate 50 has been rotated upward, when the shielding plate 50 is rotated downward, since the PGU 40 is covered by the shielding plate 50 as illustrated in FIGS. 2 and 4, the external light may be blocked from being directed to the PGU 40 so that the PGU 40 can be prevented from being damaged by the external light.

Although the actuator 60 which rotates the shielding plate 50 may be formed of one of various components, the actuator 60 may be formed as a rotary solenoid.

Since the actuator 60 is formed as the rotary solenoid, when external light which is incident via the aspheric mirror 30 and directed to the PGU 40, that is, sun burn, is detected by the separate sensor, the shielding plate 50 may be operated to cover the upper surface of the PGU 40 in a very short time.

In the present embodiment, as illustrated in FIGS. 5 to 8, the actuator 60 includes a housing 61, a rotating shaft 62, a stopper member 63, and an elastic member 66.

A power generator formed as a rotary solenoid is installed in the housing 61.

Figure 7:
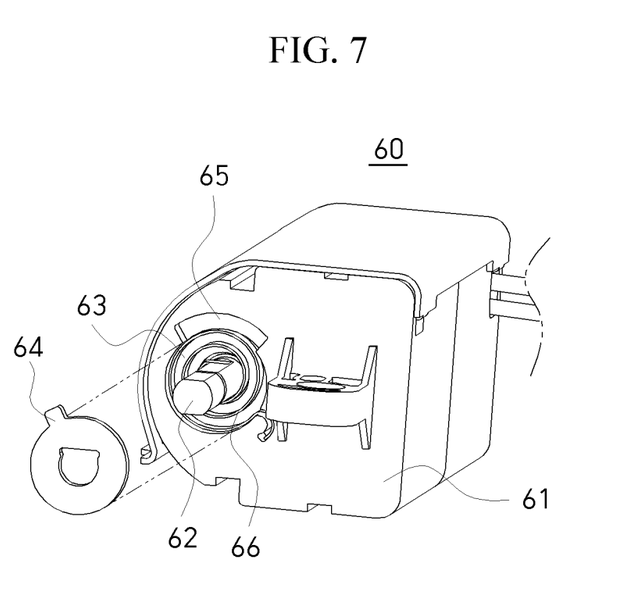
FIG. 7 is a perspective view illustrating the actuator of the head-up display according to the embodiment of the present invention.

In addition, as illustrated in FIG. 7, a rotation limiting groove 65 having an arc shape is formed in a side surface of the housing 61.

The rotating shaft 62 is connected to the power generator and rotates.

The rotating shaft 62 is coupled to the shielding plate 50 so that the shielding plate 50 is rotated with the rotating shaft 62.

The stopper member 63 is coupled to the rotating shaft 62 and rotated with the rotating shaft 62.

Figure 8:
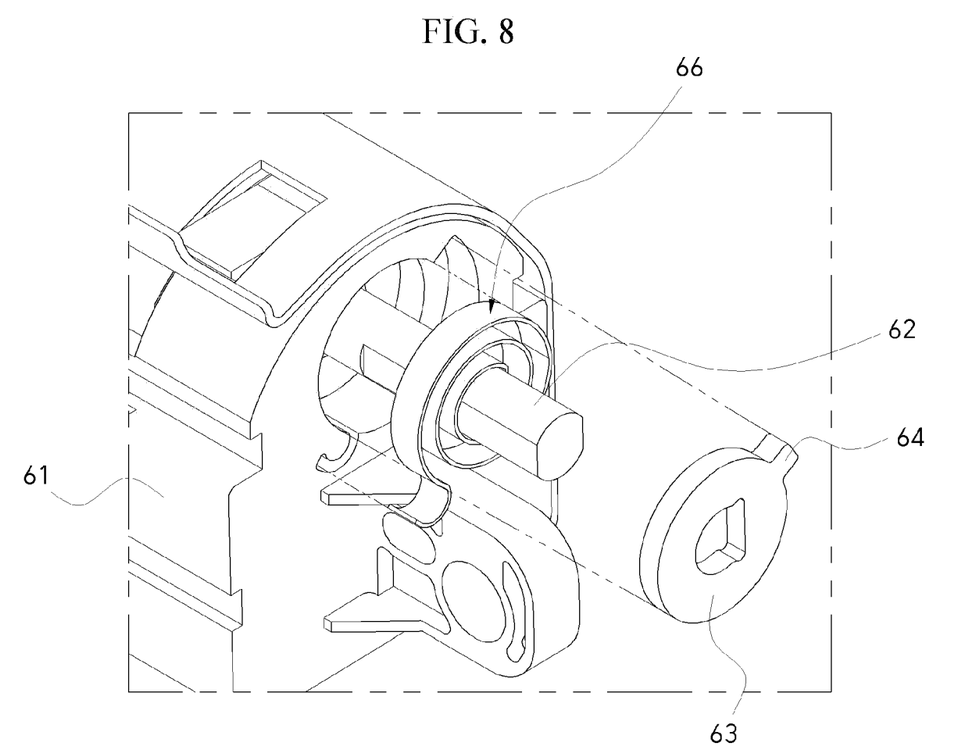
FIG. 8 is a perspective view illustrating a state in which a rotating shaft and a stopper member are separated from the actuator of the head-up display according to the embodiment of the present invention.

As illustrated in FIGS. 7 and 8, a hook protrusion 64 which is disposed in the rotation limiting groove 65 is formed on the stopper member 63.

As illustrated in FIG. 7, since the hook protrusion 64 moves in the rotation limiting groove 65, the stopper member 63 which is rotated with the rotating shaft 62 restricts a rotation of the rotating shaft 62 and the shielding plate 50 to be within a predetermined angular range.

As illustrated in FIG. 7, since one end of the elastic member 66 is coupled to the housing 61 and the other end thereof is coupled to the rotating shaft 62, the elastic member 66 applies rotatory power to the rotating shaft 62.

The elastic member 66 may be formed of one of various components, and in the present embodiment, the elastic member 66 is formed as a spiral spring.

Figure 5:
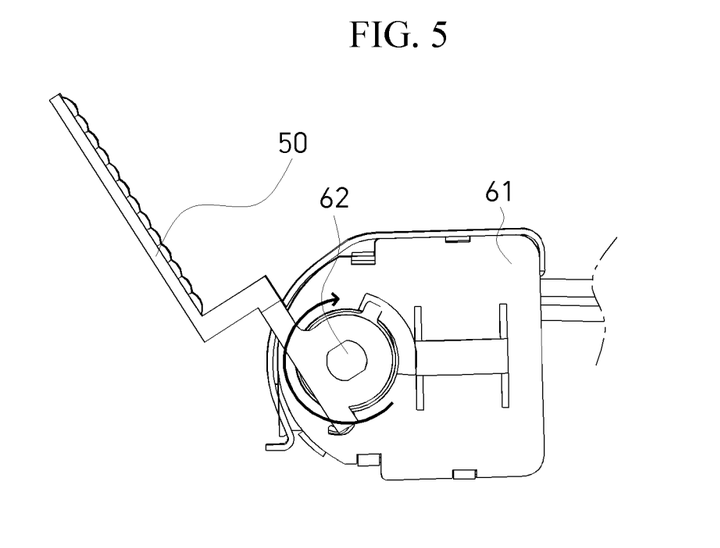
FIG. 5 is a side view illustrating states of the shielding plate and an actuator in the state illustrated in FIG. 1.
Figure 6:
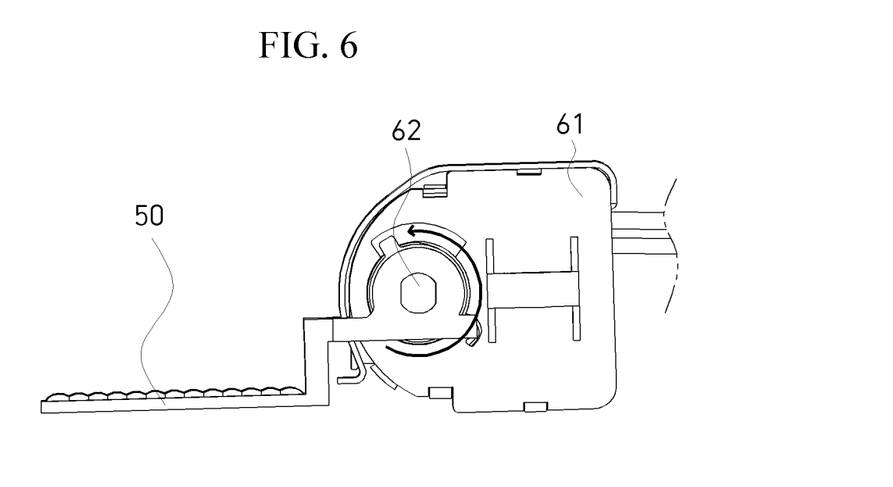
FIG. 6 is a side view illustrating states of the shielding plate and the actuator in the state illustrated in FIG. 2.

As illustrated in FIGS. 5 and 6, the shielding plate 50 is coupled to and rotated with the rotating shaft 62.

As illustrated in FIG. 5, when the rotating shaft 62 and the shielding plate 50 are rotated in one direction by the power generator, the elastic member 66 is elastically expanded.

When the electrical power generated by the power generator is removed, as illustrated in FIG. 6, the rotating shaft 62 and the shielding plate 50 are automatically rotated in the other direction due to shrinking of the elastic member 66.

In the present embodiment, as illustrated in FIG. 5, when power is applied and the rotating shaft 62 is rotated in one direction by the power generator, the elastic member 66 is elastically expanded, and the shielding plate 50 exposes the upper surface of the PGU 40 as illustrated in FIG. 1.

In addition, as illustrated in FIG. 6, when the applied power is blocked, that is, the electrical power generated by the power generator is removed, the rotating shaft 62 and the shielding plate 50 are automatically rotated by the shrinking of the elastic member 66 to cover the upper surface of the PGU 40 as illustrated in FIG. 2.

Accordingly, in a state in which power is not applied, the shielding plate 50 allows an upper portion of the light-emitting type indicator to be in an open state.

Figure 9:
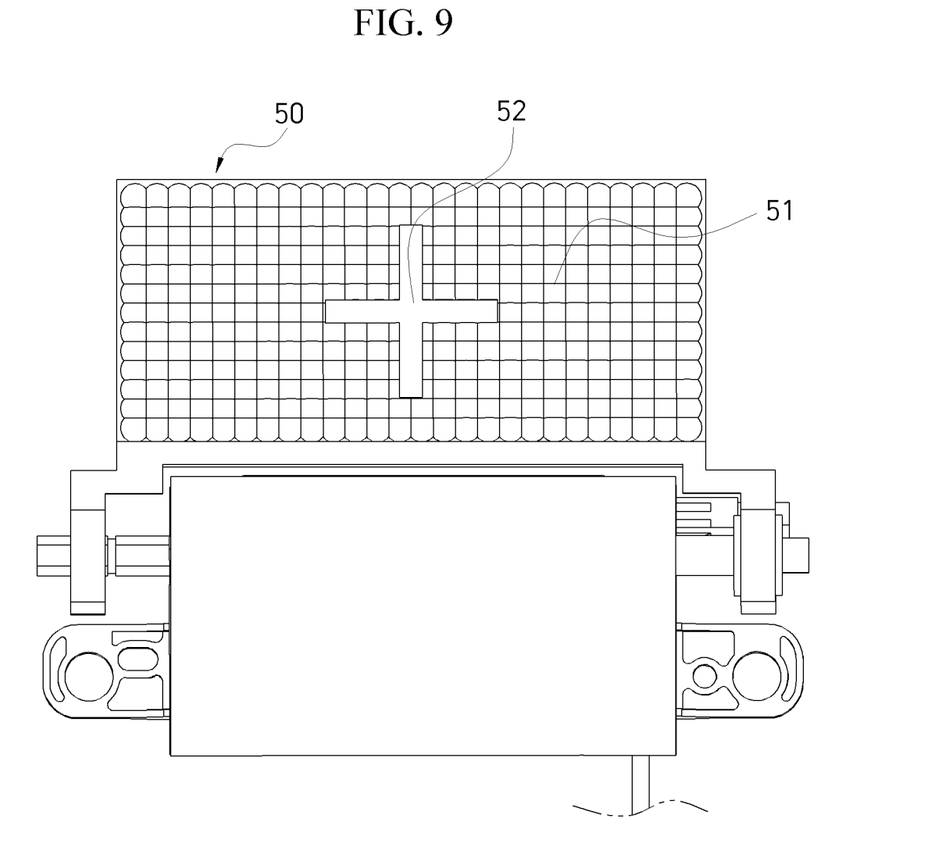
FIG. 9 is a plan view illustrating an example of one surface of the shielding plate of the head-up display according to the embodiment of the present invention.
Figure 10:
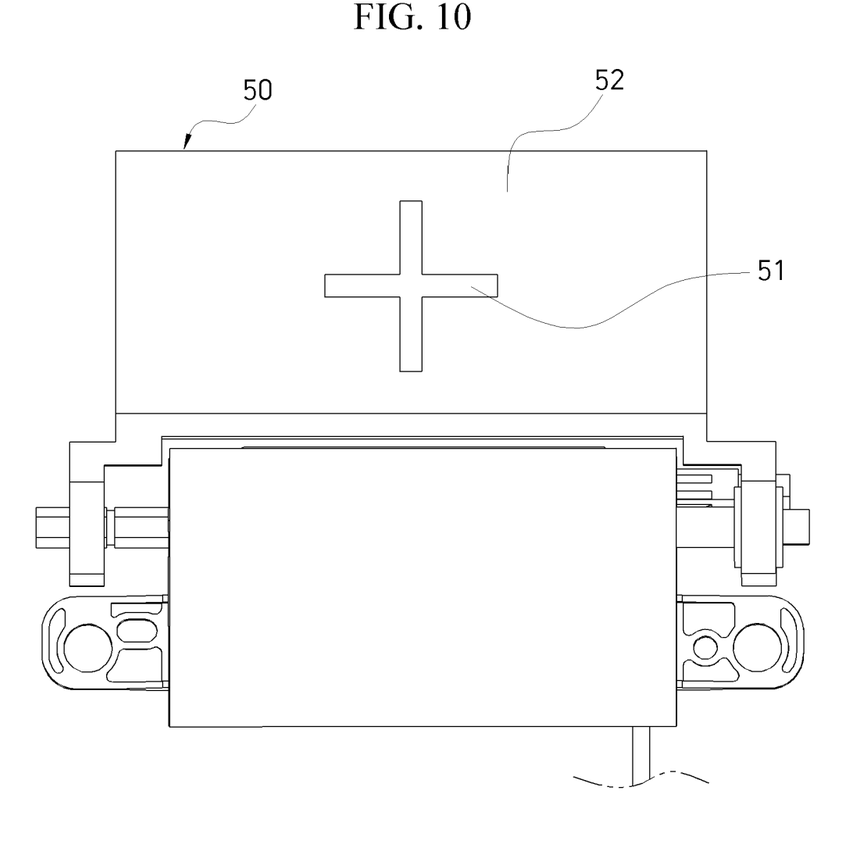
FIG. 10 is a plan view illustrating another example of one surface of the shielding plate of the head-up display according to the embodiment of the present invention.

Meanwhile, in the present invention, a non-reflective coating portion 52 and a reflective coating portion 51 are formed on one surface, which is a surface opposite to a surface facing the PGU 40 when the shielding plate 50 covers the upper surface of the PGU 40, of the shielding plate 50 as illustrated in FIGS. 9 and 10.

One surface of the shielding plate 50 faces the folding mirror 35.

When the shielding plate 50 covers the upper surface of the PGU 40, one surface of the shielding plate 50 is displayed to the outside via the folding mirror 35 and the aspheric mirror 30.

Accordingly, when the shielding plate 50 covers the upper surface of the PGU 40, a driver can see one surface of the shielding plate 50 reflected by the folding mirror 35 and the aspheric mirror 30 through a windshield of the vehicle.

In this case, since the non-reflective coating portion 52 and the reflective coating portion 51 are formed on one surface of the shielding plate 50, the driver can see the reflective coating portion 51 which is reflected due to external light and the non-reflective coating portion 52 which is not reflected.

In FIG. 9, the reflective coating portion 51 is disposed in the form of an optic array to scatter light, and the non-reflective coating portion 52 is formed in a central portion of the shielding plate 50 in which optics is removed and on which a low reflection treatment or corrosion treatment is performed.

In FIG. 9, in a case in which a sun burn warning symbol is formed as the non-reflective coating portion 52, when sun burn is detected and the shielding plate 50 covers the upper surface of the PGU 40, the driver may see the sun burn warning symbol having an engraved shape, which is not reflected due to external light, that is a dark shape.

In FIG. 10, the reflective coating portion 51 is formed in the central portion, and the non-reflective coating portion 52 is formed by transparently or low-reflectively coating one surface of the shielding plate 50 and performing a corrosion treatment on the other surface.

In FIG. 10, in a case in which a sun burn warning symbol is formed as the reflective coating portion 51, when sun burn is detected and the shielding plate 50 covers the upper surface of the PGU 40, the driver may see the sun burn warning symbol having an embossed shape, which is reflected due to external light, that is a bright shape.

Figure 11:
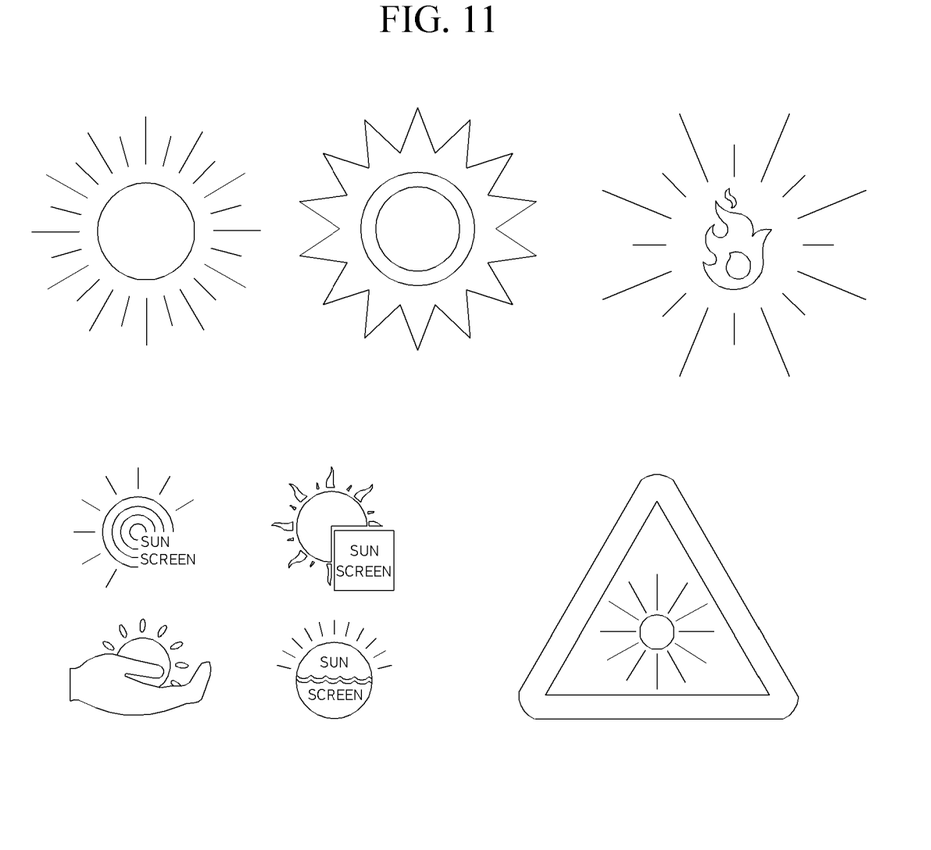
FIG. 11 is a view illustrating various warning symbols to be displayed on one surface of the shielding plate of the head-up display according to the embodiment of the present invention.

The sun burn warning symbol may be formed as one of various shapes as illustrated in FIG. 11.

In addition, in order for the reflective coating portion 51 and the non-reflective coating portion 52 formed on one surface of the shielding plate 50 to be easily viewed from the outside, one surface of the shielding plate 50 is disposed to be parallel to a display of the PGU 40 when the shielding plate 50 covers the upper surface of the PGU 40.

In the present invention, when the vehicle is parked or sun burn is detected, since the shielding plate 50 covers the upper surface of the PGU 40 to block external light, the PGU 40 can be prevented from being damaged by the external light which is directed to the PGU 40.

In addition, since the reflective coating portion 51 and the non-reflective coating portion 52 are formed on one surface of the shielding plate 50, when the shielding plate 50 covers the upper surface the PGU 40, the sun burn warning symbol may be displayed to the outside via the reflective coating portion 51 and the non-reflective coating portion 52 so that the driver can recognize a current state (sun burn state).

The vehicle head-up display having an external light blocking function according to the present invention is not limited to the above-described embodiment and may be variously modified and implemented within a range allowed by the technical spirit of the present invention.

What is claimed is:

1. A vehicle head-up display, comprising:
a screen;
an aspheric mirror located at a first side of the screen;
a folding mirror located above a second side of the screen;
a picture generate unit (PGU) located below the second side of the screen, vertically overlapping the folding mirror, and having an upper surface configured to output an image;
a shielding plate configured to selectively cover the upper surface of the PGU to block an external light from being directed to the upper surface of the PGU via the aspheric mirror and folding mirror; and
an actuator configured to rotate the shielding plate to position the shielding plate to cover the upper surface of the PGU,
wherein the image output at the upper surface of the PGU is externally displayable via the folding mirror and aspheric mirror.

2. The vehicle head-up display of claim 1, wherein:
the shielding plate is rotatably connected to the screen, and
the actuator is configured to vertically rotate the shielding plate to expose or cover the upper surface of the PGU, respectively.

3. The vehicle head-up display of claim 2, wherein the shielding plate is located between the folding mirror and PGU.

4. The vehicle head-up display of claim 2, wherein the actuator comprises a rotary solenoid configured to rotate the shielding plate when electrical power is applied.

5. The vehicle head-up display of claim 2, wherein the actuator comprises:
a housing containing a power generator;
a rotating shaft connected to and selectively receiving electrical power from the power generator, and connected and configured to rotate with the shielding plate in a first direction when the electrical power is received from the power generator; and
an elastic member having a first end connected to the housing and a second end connected to the rotating shaft, and configured to elastically expand when the rotating shaft and shielding plate rotate in the first direction,
wherein the rotating shaft and shielding plate rotate in a second direction opposite to the first direction due to shrinking of the elastic member when the power generator stops providing the electrical power to the rotating shaft.

6. The vehicle head-up display of claim 5, wherein the elastic member comprises a spiral spring.

7. The vehicle head-up display of claim 5, wherein:
when the rotating shaft rotates in the first direction and the elastic member elastically expands, the shielding plate rotates to expose the upper surface of the PGU, and
when the electrical power from the power generator is stopped, the rotating shaft and shielding plate rotate in the second direction due to shrinking of the elastic member, and the shielding plate covers the upper surface of the PGU.

8. A vehicle head-up display, comprising:
a screen;
an aspheric mirror located at a first side of the screen;
a folding mirror located above a second side of the screen;
a picture generate unit (PGU) located below the second side of the screen;
a shielding plate configured to selectively cover an upper surface of the PGU to block an external light from being directed to the PGU via the aspheric mirror and folding mirror; and
an actuator configured to rotate the shielding plate,
wherein an image generated by the PGU is externally displayable via the folding mirror and aspheric mirror,
wherein the shielding plate is rotatably connected to the screen, and the actuator is configured to vertically rotate the shielding plate to expose or cover the upper surface of the PGU, respectively, and
wherein the actuator comprises:
a housing containing a power generator;
a rotating shaft connected to and selectively receiving electrical power from the power generator, and connected to and configured to rotate with the shielding plate; and
a stopper coupled and configured to rotate with the rotating shaft,
wherein the stopper is configured to restrict a rotation of the rotating shaft and shielding plate within a predetermined angular range.

9. A vehicle head-up display comprising:
a screen;
an aspheric mirror located at a first side of the screen;
a folding mirror located above a second side of the screen;
a picture generate unit (PGU) located below the second side of the screen;

a shielding plate configured to selectively cover an upper surface of the PGU to block an external light from being directed to the PGU via the aspheric mirror and folding mirror;

an actuator configured to rotate the shielding plate; and a non-reflective coating portion and reflective coating portion formed on a first surface of the shielding plate, wherein the first surface is opposite to a second surface of the shielding plate facing the upper surface of the PGU when the shielding plate covers the upper surface of the PGU, wherein an image generated by the PGU is externally displayable via the folding mirror and aspheric mirror.

10. The vehicle head-up display of claim 9, wherein, when the shielding plate covers the upper surface of the PGU, the first surface of the shielding plate is externally visible via the aspheric mirror.

11. The vehicle head-up display of claim 10, wherein the non-reflective coating portion comprises a low reflective or anti-corrosion material.

12. The vehicle head-up display of claim 10, wherein the non-reflective coating portion comprises a transparent or low-reflective coating layer on the first surface of the shielding plate.

13. The vehicle head-up display of claim 10, wherein, when the shielding plate covers the upper surface of the PGU, the first surface of the shielding plate is located parallel to the upper surface of the PGU.

14. A vehicle head-up display comprising:

a case;

a screen positioned within the case;

an aspheric mirror positioned at a first side of the screen;

a folding mirror positioned above a second side of the screen;

a picture generate unit (PGU) positioned below the second side of the screen, vertically overlapping the folding mirror, and having an upper surface configured to output an image;

a shielding plate positioned between the folding mirror and the PGU and configured to selectively cover the upper surface of the PGU; and an actuator configured to rotate the shielding plate to position the shielding plate to cover the upper surface of the PGU, wherein an image output at the upper surface of the PGU is externally displayable via the folding mirror and aspheric mirror, wherein a non-reflective coating portion is formed on a first surface of the shielding plate facing the folding mirror, and wherein, when the shielding plate is rotated by the actuator to cover the upper surface of the PGU, the shielding plate blocks an external light beam from being directed to the PGU via the aspheric mirror and folding mirror.

15. The vehicle head-up display of claim 14, wherein, when the shielding plate covers the upper surface of the PGU, the first surface of the shielding plate is externally visible via the folding mirror and the aspheric mirror.

16. The vehicle head-up display of claim 15, wherein:

the shielding plate is rotatably connected to the screen, and the actuator is configured to vertically rotate the shielding plate to expose or cover the upper surface of the PGU, respectively.

17. The vehicle head-up display of claim 15, wherein, when the shielding plate covers the upper surface of the PGU, the first surface of the shielding plate is located parallel to the upper surface of the PGU.

18. A display comprising:

a case;

a screen located within the case;

an aspheric mirror located at a first side of the screen;

a folding mirror located above a second side of the screen;

a picture generate unit (PGU) located bellow the second side of the screen, vertically overlapping the folding mirror, and having an upper surface configured to output an image;

a shielding plate configured to selectively cover the upper surface of the PGU; and an actuator configured to rotate the shielding plate to position the shielding plate to cover the upper surface of the PGU, wherein an image output at the upper surface of the PGU is externally displayed via the folding mirror and aspheric mirror, and wherein, when the upper surface of the PGU is covered by the shielding plate, the shielding plate blocks an external light beam from being directed to the PGU via the aspheric mirror and folding mirror.

* * * * *